United States Patent
Araki et al.

(10) Patent No.: US 10,897,593 B2
(45) Date of Patent: Jan. 19, 2021

(54) MULTIPLE TAPE VIDEO DATA SPLITTER

(71) Applicant: International Business Machines Corporation, Armonk, NY (US)

(72) Inventors: Hiroshi Araki, Yokohama (JP); Shinobu Fujihara, Yamato (JP); Tohru Hasegawa, Tokyo (JP); Takeshi Ishimoto, Kawasaki (JP); Hiroshi Itagaki, Yokohama (JP); Hiroyuki Miyoshi, Kawasaki (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 15/251,368

(22) Filed: Aug. 30, 2016

(65) Prior Publication Data
US 2018/0063469 A1    Mar. 1, 2018

(51) Int. Cl.
| | | |
|---|---|---|
| *H04N 5/782* | (2006.01) | |
| *G11B 20/12* | (2006.01) | |
| *G11B 20/10* | (2006.01) | |
| *G11B 27/00* | (2006.01) | |

(52) U.S. Cl.
CPC ....... *H04N 5/782* (2013.01); *G11B 20/10527* (2013.01); *G11B 20/1201* (2013.01); *G11B 27/002* (2013.01); *G11B 2020/10666* (2013.01); *G11B 2220/90* (2013.01)

(58) Field of Classification Search
CPC ...... H04N 5/782; G11B 15/22; G11B 27/005; G11B 27/032; G11B 2020/10666; G11B 2220/90

USPC .............. 386/323, 263, 241; 360/55, 69; 348/143; 375/240.01; 369/47.23
See application file for complete search history.

(56) References Cited

U.S. PATENT DOCUMENTS

| | | | |
|---|---|---|---|
| 6,373,798 B1* | 4/2002 | Arai ...................... | G11B 19/02 369/30.2 |
| 8,213,104 B2 | 7/2012 | Fujihara | |
| 9,552,370 B1* | 1/2017 | McCloskey ........... | G06F 16/188 |
| 2001/0022620 A1* | 9/2001 | Niwa ..................... | H04N 5/772 348/231.99 |
| 2004/0170379 A1* | 9/2004 | Yao .................. | H04N 21/23106 386/241 |
| 2005/0122863 A1* | 6/2005 | Kudo .................. | H04N 9/7921 369/47.23 |

(Continued)

FOREIGN PATENT DOCUMENTS

| | | | |
|---|---|---|---|
| JP | 2002298501 A | * | 10/2002 |
| JP | 2006255078 A | | 9/2006 |

(Continued)

*Primary Examiner* — Thai Q Tran
*Assistant Examiner* — Stephen R Smith
(74) *Attorney, Agent, or Firm* — Gilbert Harmon, Jr.

(57) ABSTRACT

An approach, for storing video data in a plurality of tape media via a ring buffer. A tape data splitter receives video data stored in a ring buffer. The tape data splitter writes the video data to a current tape media. The tape data splitter detects an end of tape media event. The tape data splitter responds to the end of tape media event, by switching the current tape media to a next tape media. The tape data splitter selects a resume point for the video data stored in the ring buffer and writes to the next tape media, the video data stored in the ring buffer that is subsequent to the resume point.

20 Claims, 4 Drawing Sheets

(56) References Cited

U.S. PATENT DOCUMENTS

| | | | | |
|---|---|---|---|---|
| 2006/0062545 | A1* | 3/2006 | Kim | G11B 20/10 |
| | | | | 386/248 |
| 2007/0199040 | A1* | 8/2007 | Kates | H04N 5/76 |
| | | | | 725/134 |
| 2007/0217501 | A1 | 9/2007 | Siemens et al. | |
| 2009/0271544 | A1* | 10/2009 | Oishi | G06F 5/12 |
| | | | | 710/53 |
| 2010/0265606 | A1* | 10/2010 | Thompson | G11B 5/86 |
| | | | | 360/15 |
| 2011/0273586 | A1* | 11/2011 | Ohnishi | H04N 9/8205 |
| | | | | 348/231.1 |
| 2013/0191588 | A1* | 7/2013 | Starr | G06F 3/0611 |
| | | | | 711/112 |
| 2015/0026510 | A1* | 1/2015 | Katagiri | G11B 20/1886 |
| | | | | 714/6.11 |
| 2015/0037010 | A1* | 2/2015 | Abe | H04N 5/783 |
| | | | | 386/263 |
| 2016/0286156 | A1* | 9/2016 | Kovac | H04N 5/772 |

FOREIGN PATENT DOCUMENTS

| | | | |
|---|---|---|---|
| JP | 2007109297 | A | 4/2007 |
| JP | 2009201132 | A | 9/2009 |
| JP | 2010218232 | A | 9/2010 |

* cited by examiner

MULTIPLE TAPE VIDEO DATA SPLITTER

BACKGROUND OF THE INVENTION

The present invention relates generally to video data storage and more particularly, to storing video data in a plurality of tape media via a ring buffer.

In an environment of ultra-high performance, high image quality video such as, but not limited to, 8K High Definition (HD) television broadcasting, video storage can consume increasingly large storage space. For example, 8K television can consume approximately 16 Terabytes (TB) per hour in 12-bit, ¼ compression mode. Tape media is known in the art as a low cost storage technology for storing large amounts data. When storing large video stream data, tape media capacity can be consumed and require additional tape media to continue recording the video data.

In some video data streams there can be segments of video where each segment is known as a "cut" and the transition/space between a cut is known as a "cut point", however other video data streams can be continuous (e.g., video data from a video surveillance environment). When dividing video data between two tape media an end point of a first tape media and a resume point of a second tape media can introduce undesirable fragmentation of video data.

SUMMARY

As disclosed herein, a method, for storing video data in a plurality of tape media via a ring buffer, the method comprising: receiving, by a tape data splitter, video data stored in a ring buffer; writing, by the tape data splitter, the video data to a current tape media; detecting, by the tape data splitter, an end of tape media event; responsive to the end of tape media event, switching, by the tape data splitter, the current tape media to a next tape media; selecting, by the tape data splitter, a resume point for the video data stored in the ring buffer and writing, by the tape data splitter, to the next tape media, the video data stored in the ring buffer that is subsequent to the resume point. A computer system and a computer program product corresponding to the above method are also disclosed herein.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Embodiments of the present invention provide an approach to storing video data on a plurality of tape media via a ring buffer. The ring buffer enables embodiments of the present invention to identify portions and/or complete video data cuts to store overlap of those video data cuts/segments to a next tape media by switching from a current tape media to a next tape media and rewriting a segment of video data content stored in the ring buffer to capture complete video data segments (e.g., cuts) as writing of video data resumes on the next tape media. Some embodiments can operate with a cut detection function to identify cut points in video data, for those video data comprising cuts, to identify a point video data can be split as writing toward the next tape media resumes. Further, some embodiments can operate using a 'minimum secured time interval' to establish an interval of video data overlap to be written to a next tape during a video data split. A minimum secured time interval can be a predetermined period of time established by methods such as, but not limited to, determining a time span equal or greater to a longest cut duration of a video data source (e.g., by sampling and/or from video entirety), time span(s) based on a history of cut durations for types of video data (e.g., DVD movie, surveillance feed, sports broadcast, etc.) and a fixed period based a one or more parameters.

A ring/circular buffer is known by one skilled in the art as a storage cache that can store sequential data, in a logical loop, where prior storage locations can be overwritten as next storage location become filled with data, enabling a First-In-First-Out (FIFO) buffer. In embodiments of the present invention, the ring buffer can continuously store video data as video data is received and can act as a storage cache used to progressively capture portions of video data from sources such as, television broadcasters, video editors, storage media, surveillance feeds, etc. The size of the ring buffer can be established to encompasses a time interval of at least a video data duration of a predetermined minimum secured time interval and/or a longest cut duration (e.g., video data duration between breaks in a scene/segment), plus a predetermined margin time interval (e.g., seconds/minutes). The ring buffer logically circles a storage cache where the head of the cache writes/overwrites storage space up to the tail of the cache and the storage space between the head and tail of the cache are not overwritten until a range of the storage space is 'released'. If storage between a tail and a head of the cache is not released the distance between the tail and head of the cache increase in the ring until the head of the cache reaches the tail of the cache and the ring buffer becomes full. When ring buffer storage space is cleared, the tail of the cache advances to the beginning of the uncleared storage and the head of the cache can advance as data is stored in the space available between the head and tail of the cache. It should be noted that some ring buffer implementations can automatically overwrite data at a tail of the buffer and advancing the tail of the buffer, without a need to clear buffer data, as the head of the buffer advances with received data. Establishment of a sufficient ring buffer size, as previously described, can support automatic ring buffer data overwrite operations without losing video data used to store complete cut plus margin time interval and/or minimum secured time interval plus margin time interval as end of tape media events are detected. Embodiments of the present invention can detect the end of a current tape media (e.g., end of tape media event) as video data is written toward the current tape media and received in the ring buffer. When the end of a tape media is detected, a switch is performed toward a next tape media, data beginning from the last cut point (e.g., inclusive of a margin time interval) and/or the minimum secured time point (e.g., inclusive of a margin time interval) is received from a ring buffer and can resume writing toward the next tape media with successive video data. Further, some embodiments can operate the ring buffer to release cache as data is written toward tape media that precedes a current cut plus a margin time interval and/or the minimum secured time interval plus a margin time interval.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

Figure 1:
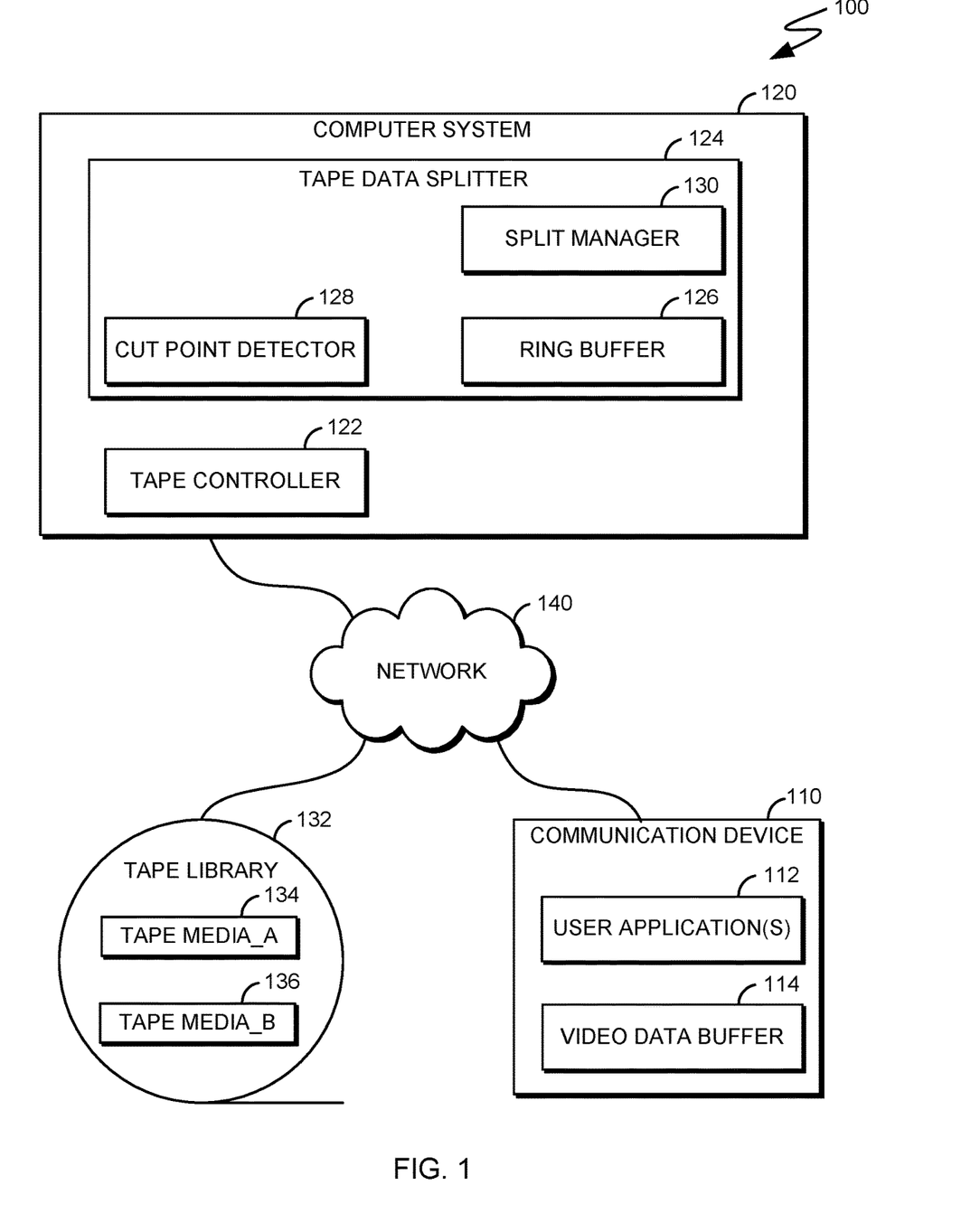
FIG. 1 illustrates a functional block diagram of a computing environment, in accordance with an embodiment of the present invention.

FIG. 1 illustrates a functional block diagram of computing environment 100, in accordance with an embodiment of the present invention. Computing environment 100 comprises COMMUNICATION DEVICE 110, COMPUTER SYSTEM 120 and TAPE LIBRARY 132, interconnected via NETWORK 140. COMMUNICATION DEVICE 110, COMPUTER SYSTEM 120 and TAPE LIBRARY 132 can be desktop computers, laptop computers, specialized computer servers, or the like. In certain embodiments, COMMUNICATION DEVICE 110, COMPUTER SYSTEM 120 and TAPE LIBRARY 132 collectively represent computer systems utilizing clustered computers and components acting as a single pool of seamless resources via NETWORK 140. For example, such embodiments can be used in data center, cloud computing, storage area network (SAN), and network attached storage (NAS) applications. In general, COMMUNICATION DEVICE 110, COMPUTER SYSTEM 120 and TAPE LIBRARY 132 are representative of any electronic devices, or combination of electronic devices, capable of executing computer readable program instructions, as described in detail with regard to FIG. 4.

In some embodiments, COMMUNICATION DEVICE 110 can be a plurality of COMMUNICATION DEVICES 110 and COMMUNICATION DEVICE 110 can be a separate and/or integrated tool that can be operated to play video data and edit video data. In the depicted embodiment, COMMUNICATION DEVICE 110 comprises USER APPLICATION(S) 112 and VIDEO DATA BUFFER 114.

In some embodiments, USER APPLICATION(S) 112 can be a plurality of USER APPLICATION(S) 112 within COMMUNICATION DEVICE 110. USER APPLICATION(S) 112 can edit video data to perform operations such as, but not limited to, creating cuts and cut points for video data. In some embodiments, USER APPLICATION(S) 112 can comprise any combination of commercial or custom devices and/or software products associated with managing video data.

In some embodiments, VIDEO DATA BUFFER 114 can be a plurality of VIDEO DATA BUFFERS 114 within COMMUNICATION DEVICE 110 and/or COMPUTER SYSTEM 120. VIDEO DATA BUFFER 114 can be a video data source from sources such as, but not limited to, commercial and/or private broadcasters, surveillance equipment, playback devices, steaming services and storage systems. VIDEO DATA BUFFER 114 can output video data for recording to tape media by some embodiments. In some embodiments, VIDEO DATA BUFFER 114 can comprise any combination of commercial or custom devices and/or software products associated with operating video data output.

NETWORK 140 can be, for example, a local area network (LAN), a wide area network (WAN) such as, the Internet, or a combination of the two, and include wired, wireless, or fiber optic connections. In general, NETWORK 140 can be any combination of connections and protocols that will support communications between COMMUNICATION DEVICE 110, COMPUTER SYSTEM 120 and TAPE LIBRARY 132, in accordance with an embodiment of the present invention.

In some embodiments, TAPE LIBRARY 132 can be a plurality of TAPE LIBRARIES 132 and TAPE LIBRARY 132 can be a separate and/or integrated tool that can operate one or more tape drives and/or a plurality of tape media data storage. In the depicted embodiment, TAPE LIBRARY 132 comprises TAPE MEDIA_A 134 and TAPE MEDIA_B 136, for illustrative purposes and TAPE LIBRARY 132 can comprise a one or more tape drives and/or plurality of tape media and is not limited to TAPE MEDIA_A 134 and TAPE MEDIA_B 136. TAPE LIBRARY 132 can operate TAPE MEDIA_A 134 and TAPE MEDIA_B 136, formatted in standards such as, but not limited to, Linear Tape File System (LTFS). In some embodiments, TAPE LIBRARY 132 can comprise any combination of commercial or custom devices and/or software products associated with operating digital tape media.

In some embodiments, COMPUTER SYSTEM 120 comprises TAPE CONTROLLER 122 and TAPE DATA SPLITTER 124.

In some embodiments, TAPE CONTROLLER 122 can be a plurality of TAPE CONTROLLERS 122 within COMPUTER SYSTEM 120. TAPE CONTROLLER 122 can operate TAPE LIBRARY 132 to perform functions such as, but not limited to, mount, unmount, read, write, switch between tape media and eject tape media. In some embodiments, TAPE CONTROLLER 122 can comprise any combination of commercial or custom devices and/or software products associated with operating TAPE LIBRARY 132.

In some embodiments, TAPE DATA SPLITTER 124 can be a plurality of TAPE DATA SPLITTERS 124 within COMPUTER SYSTEM 120 and TAPE DATA SPLITTER 124 can be a separate and/or integrated tool that can be detect an end of a data tape media, detect video data cuts, select video stored in a ring buffer, operate tape media switching and pause/write video data toward tape media. In the depicted embodiment, TAPE DATA SPLITTER 124 comprises, RING BUFFER 126, CUT POINT DETECTOR 128 and SPLIT MANAGER 130. In some embodiments, TAPE DATA SPLITTER 124 operates in conjunction with a combination of commercial or custom devices and/or software products associated with tape data splitting between current tape media and a next tape media.

In some embodiments, RING BUFFER 126 can be a plurality of RING BUFFERS 126 within TAPE DATA SPLITTER 124. RING BUFFER 126 can receive video data at a data rate sufficient to capture predetermined margin time interval and one or more video data segments comprising one or more video cuts and/or one or more minimum secured time intervals from VIDEO DATA BUFFER 114. RING BUFFER 126 can operate as a FIFO data store for writing and splitting video data between a plurality of tape media. In some embodiments, RING BUFFER 126 can operate sequentially by passing video data through RING BUFFER 126 as a video data source written toward TAPE LIBRARY 132 and in other embodiments, RING BUFFER 126 can operate as a parallel data source between VIDEO DATA BUFFER 114 and TAPE LIBRARY 132 during tape data splitting events. For example, in a parallel embodiment of the present invention, TAPE MEDIA_A 134 can be written from VIDEO DATA BUFFER 114 and when an end of tape media event is detected, RING BUFFER 126 video data can be used to insert video data toward TAPE MEDIA_B 136 before resuming VIDEO DATA BUFFER 114 writing toward TAPE MEDIA_B 136. In another example, using a sequential embodiment of the present invention, TAPE MEDIA_A 134 can be written from RING BUFFER 126 and when an end of tape media event is detected, RING BUFFER 126 video data can be selected from RING BUFFER 126 as a resume point for writing successive video data toward TAPE MEDIA_B 136. In some embodiments, RING BUFFER 126 can comprise any combination of commercial or custom devices and/or software products associated with operating and maintaining a ring buffer.

In some embodiments, CUT POINT DETECTOR 128 can be a plurality of CUT POINT DETECTORS 128 within TAPE DATA SPLITTER 126. CUT POINT DETECTOR 128 can monitor video data flows through RING BUFFER 126 from VIDEO DATA BUFFER 114 toward TAPE MEDIA_A 134/TAPE MEDIA_B 136, detecting cut points (e.g., boundary between cuts) in video data. CUT POINT DETECTOR 128 can identify/mark a previous cut point as a cut point is detected at the start of a of the current video segment/cut. CUT POINT DETECTOR 128 can store identifiers such as, but not limited to, timestamp of video data. In some embodiments, CUT POINT DETECTOR 128 can comprise any combination of commercial or custom devices and/or software products associated with video segment and/or cut point detection of video data.

In some embodiments, SPLIT MANAGER 130 can be a plurality of SPLIT MANAGERS 130 within TAPE DATA SPLITTER 126. SPLIT MANAGER 130 can monitor TAPE CONTROLLER 122 to detect an end of tape media event during writing of video data toward tape media (e.g., TAPE MEDIA_A 134). An end of tape media event can be determined as an identification of a physical end of the tape media and/or a predetermined buffer time preceding the physical the end of tape media. When an end of tape media event is detected, SPLIT MANAGER 130 can operate with TAPE CONTROLLER 122 to pause recording video data (e.g., VIDEO DATA BUFFER 114) toward the current tape media (e.g., TAPE MEDIA_A 134), switch to a next tape media (e.g., TAPE MEDIA_B 136), select a resume point based on the cut point of a current cut, identified by CUT POINT DETECTOR 128, stored in RING BUFFER 126, resume writing the successive video data from the resume/start point to the next tape media and clear RING BUFFER 126 storage prior to the resume point. In a case where continuous video data is processed (e.g., no cut points) and/or CUT POINT DETECTOR 128 is not used, when an end of tape media event is detected, SPLIT MANAGER 130 can use a predetermined minimum secured time interval to select a resume point in RING BUFFER 126 as a start point to resume writing of successive video data to the next tape media. It should be noted, SPLIT MANAGER 130 can clear data stored in RING BUFFER 126 as a minimum secured time point (e.g., the starting point of a minimum secured time interval) is exceeded and as video data is written toward tape media (e.g., TAPE MEDIA_A 134, TAPE MEDIA_B 136) to prevent exhausting the capacity of RING BUFFER 126. It should be further noted that, SPLIT MANAGER 130 can clear prior cuts identified by CUT POINT DETECTOR 128 stored in RING BUFFER 126 and as video data is written toward tape media (e.g., TAPE MEDIA_A 134, TAPE MEDIA_B 136) to prevent exhausting RING BUFFER 126 capacity (e.g., head of cache reaches tail of cache).

Figure 2:
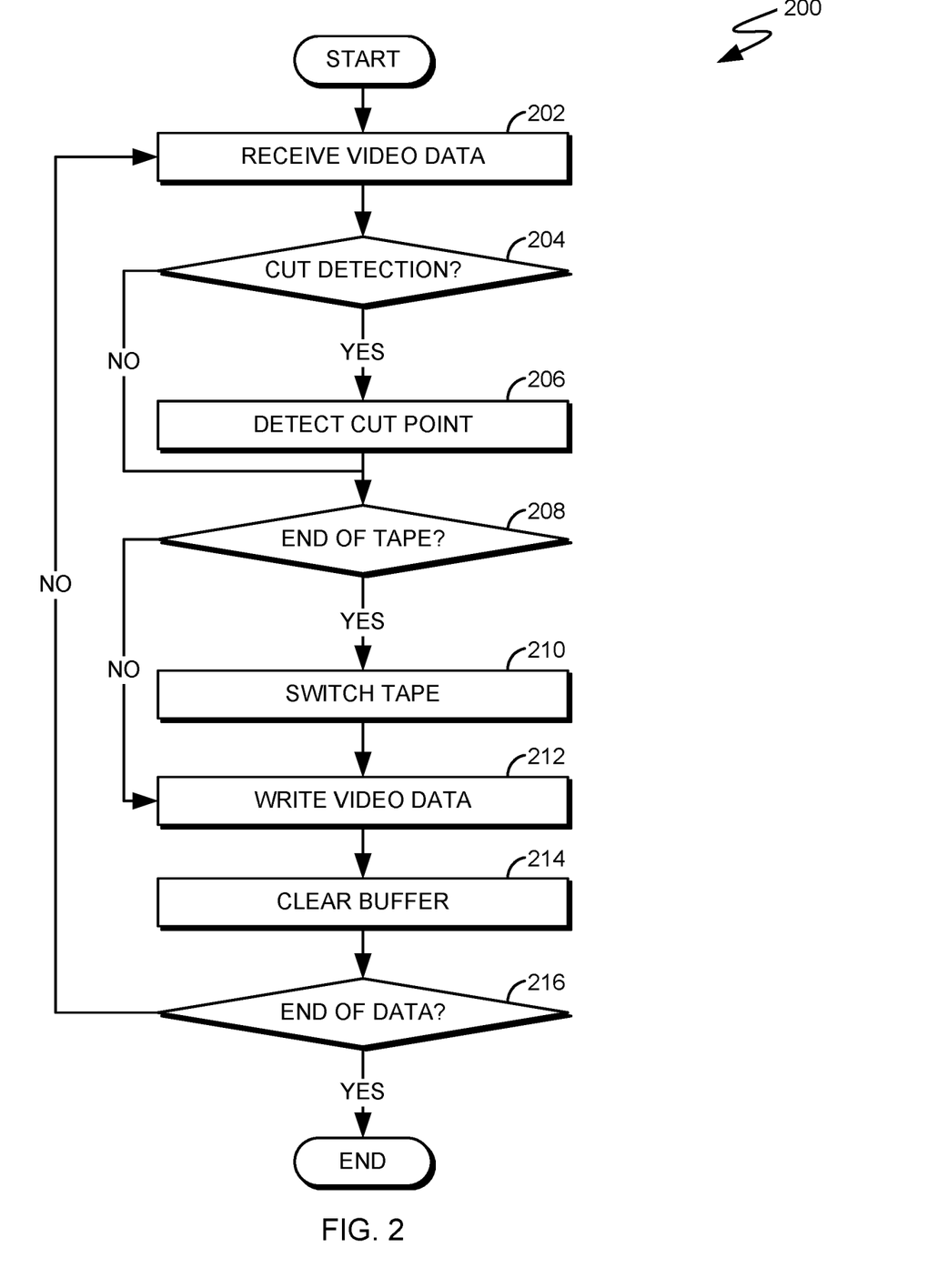
FIG. 2 illustrates a flowchart of tape data splitting, in accordance with an embodiment of the present invention.

FIG. 2 illustrates a flowchart of tape data splitting, in accordance with an embodiment of the present invention. Tape data splitting 200, comprises operations RECEIVE VIDEO DATA 202, CUT DETECTION 204, DETECT CUT POINT 206, END OF TAPE 208, SWITCH TAPE 210, WRITE VIDEO DATA 212, CLEAR BUFFER 214 and END OF DATA 216.

Operation RECEIVE VIDEO DATA 202, can receive video data in RING BUFFER 126 that is written to a current tape media (e.g., TAPE MEDIA_A 134). As operation RECEIVE VIDEO DATA 202 continues receiving video data (e.g., VIDEO DATA BUFFER 114), processing proceeds toward operation CUT DETECTION 204.

Operation CUT DETECTION 204, can determine if video data comprises cut points/cut segments and if so, CUT POINT DETECTOR 128 is activated and processing proceeds toward operation DETECT CUT POINT 206. Otherwise, operation CUT DETECTION 204 processing proceeds toward operation END OF TAPE 208.

Operation DETECT CUT POINT 206, can monitor video data as received toward RING BUFFER 126, to detect when a cut point occurs. Each detected cut point becomes a previous cut point and can be identified as a resume point if an end of tape media event occurs. Operation DETECT CUT POINT 206 can continue to process VIDEO DATA BUFFER 114 video data, as execution proceeds toward operation END OF TAPE 208.

Operation END OF TAPE 208, can detect if an end of tape media has been reached (e.g., end of tape media event) by techniques such as, but not limited to, SPLIT MANAGER 130 receiving TAPE CONTROLLER 122 operating status. When operation END OF TAPE 208 detects an end of tape media event, processing proceeds toward operation SWITCH TAPE 210. Otherwise, operation END OF TAPE 208 processing proceeds toward operation WRITE VIDEO DATA 212.

Operation SWITCH TAPE 210, can pause/stop current tape media recording via TAPE CONTROLLER 122 and switch tape media to a next tape media (e.g., TAPE MEDIA_A 134 toward TAPE MEDIA_B 136). When Operation SWITCH TAPE 210 completes, processing proceeds toward operation WRITE VIDEO DATA 212. It should be noted that in some embodiments, notifications can be sent toward an operator and/or management system(s) to indicate one or more tape media is full so that actions such as, but not limited to, tape media collection and tape media replacement can be performed with TAPE LIBRARY 132.

When operation WRITE VIDEO DATA 212, is initiated by an end of tape media event, TAPE DATA SPLITTER 124 can select a resume point from RING BUFFER 126, inclusive of an added margin time point (e.g., the start of a predetermined margin time interval) to create a new start point from which to resume video data writing toward a next tape media. When an end of tape media event did not occur, operation WRITE VIDEO DATA 212 can sequentially write queued video data in RING BUFFER 126 to continue video data writing toward a current tape media. When Operation WRITE VIDEO DATA 212 completes, processing proceeds toward operation CLEAR BUFFER 214.

Operation CLEAR BUFFER 214, can clear RING BUFFER 126 video data that has been written toward tape media and preceding a resume point to maintain cache content with a most recent/previous cut and/or a minimum secured time interval for use during an end of tape media event. It should be noted that a predetermined margin time interval can be added to reserve extra video data beyond a cut and/or minimum secured time interval. When operation CLEAR BUFFER 214 completes, processing proceeds toward operation END OF DATA 216.

Operation END OF DATA 216, can determine if the end of video data (e.g., VIDEO DATA BUFFER 114) is reached. For example, a user can discontinue playback/recording being recorded and/or a video data broadcast can conclude. When the end of data is reached, write operations to tape media can conclude when remaining video data in RING BUFFER 126 is processed. If end of data is not reached, processing progresses toward operation RECEIVE VIDEO DATA 202. It should be noted that multiple tapes can be consumed during a recording operation of VIDEO DATA BUFFER 114 and once the next tape media, identified from operation SWITCH TAPE 210, is being used for writing, the next tape media can be identified as a current tape media and a replacement tape can be identified as a next tape. In this example, a plurality of tape media can be operated repeatedly to record a video data stream.

Figure 3A:
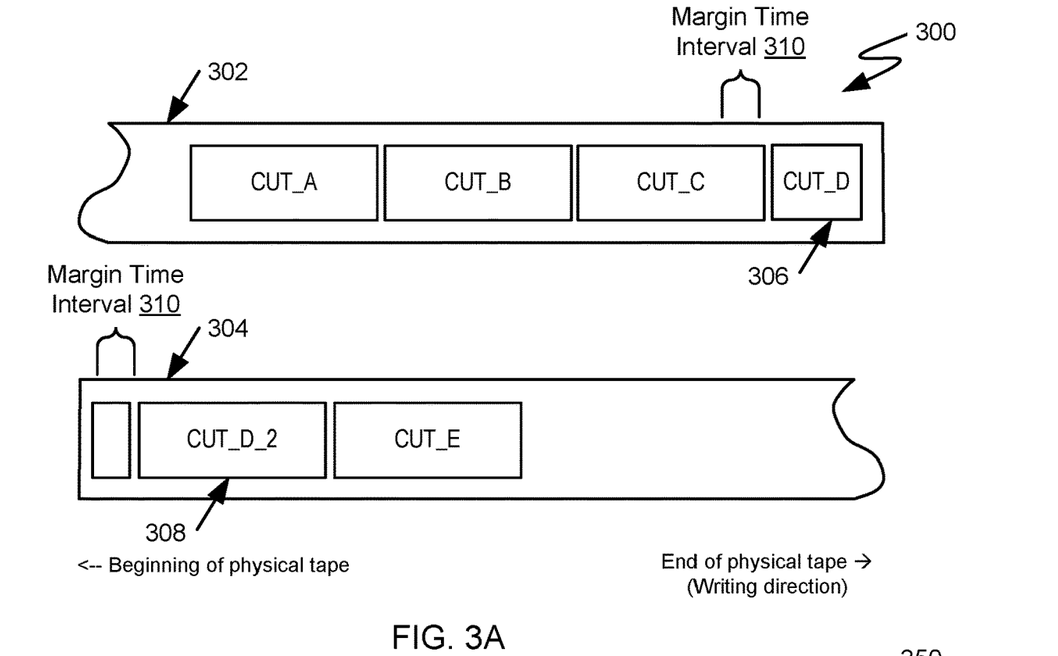
FIGS. 3A and 3B illustrate physical tape media content splitting, in accordance with an embodiment of the present invention.

FIG. 3A illustrates physical tape media content splitting, in accordance with an embodiment of the present invention. Media content splitting with Cut Detection 300 represents physical tape media content splitting using cut detection and comprises items TAPE_1 302, TAPE_2 304, CUT_D 306, CUT_D_2 308 and Margin Time Interval 310.

Item TAPE_1 302 illustrates a physical current tape media whereas item TAPE_2 304 illustrates a next tape media. Item TAPE_1 302 depicts CUT_A, CUT_B and CUT_C have been recorded and item CUT_D 306 is cut fragment when an end of tape media event for item TAPE_1 302 was detected by TAPE DATA SPLITTER 124. In this example, a resume point is identified by CUT POINT DETECTOR 128 from the previous cut point and video data in RING BUFFER 126 is selected as a starting point for writing to item TAPE_2 304. Item TAPE_1 302 is switched to item TAPE_2 304 and item CUT_D_2 308 is recorded as a complete video data cut (e.g., successive video data). It should be noted that item TAPE_2 304 depicts subsequent CUT_E as video data continued to be written to item TAPE_2 304. It should be further noted that cut point detection can be a benefit to video data editors as entire cuts reside on a single tape media and avoid intra-cut fragmentation. Item Margin Time Interval 310 illustrates a predetermined video margin segment preceding item CUT_D 306 that is written toward item TAPE_2 304 in advance of item CUT_D_2 308.

Figure 3B:
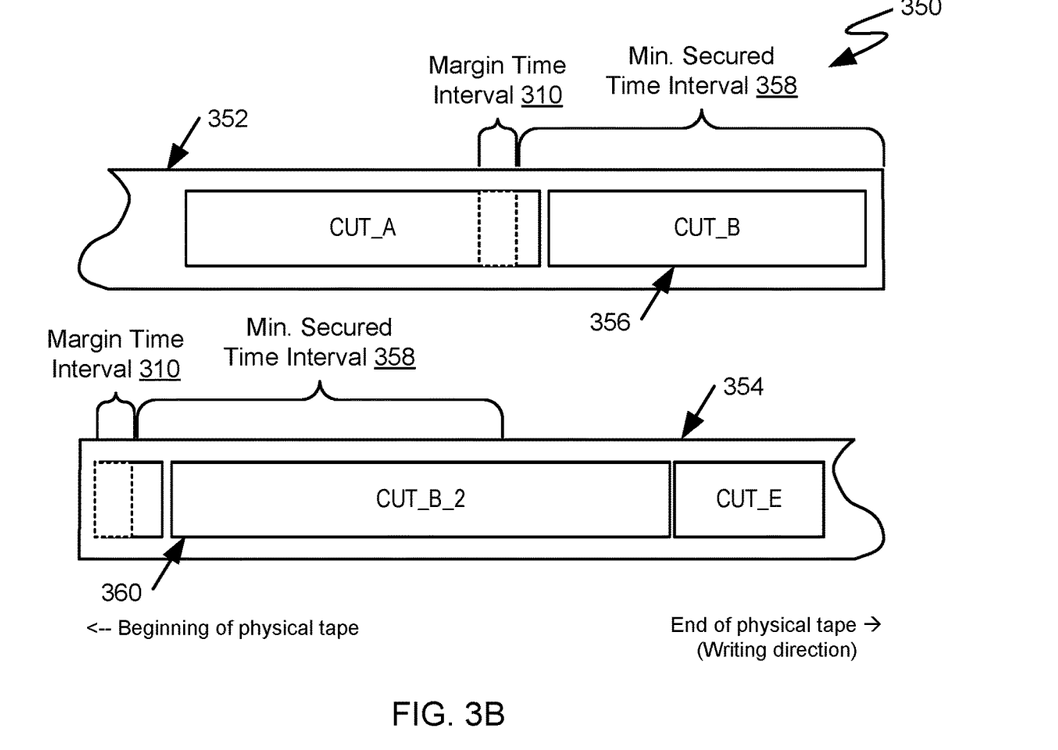

FIG. 3B illustrates physical tape media content splitting, in accordance with an embodiment of the present invention. Media content splitting 350 represents physical tape media content splitting using a minimum secured time interval and comprises items TAPE_1 352, TAPE_3 354, CUT_B 356, Min. Secured Time Interval 358, CUT_B_2 360 and Margin Time Interval 310.

Item TAPE_1 352 illustrates a physical current tape media whereas item TAPE_3 354 illustrates a next tape media. Item TAPE_1 352 depicts item CUT_B 356 has been written to item TAPE_1 352 while an end of tape media event for item TAPE_1 352 was detected by TAPE DATA SPLITTER 124. In this example, item Min. Secured Time Interval 358 is used instead of CUT POINT DETECTOR 128 to determine a resume point in the video data in RING BUFFER 126. Item TAPE_1 352 is switched to item TAPE_3 354 and item CUT_B_2 360 is written toward item TAPE_3 354 from the resume point and writing proceeds with the successive video data of item CUT_B_2 360. In this example, item Min. Secured Time Interval 358 exceeds item CUT_B_2 360 duration, making item CUT_B_2 360 a complete cut/video segment stored on item TAPE_3 354. It should be noted that the minimum secured time interval can provide a sufficient overlap between tape media for video data editors to establish seamless transitions as tape media is switched during video data editing and playback. Item Margin Time Interval 310 illustrates a predetermined video margin segment preceding item Min. Secured Time Interval 358 that is written toward item TAPE_3 354.

Figure 4:
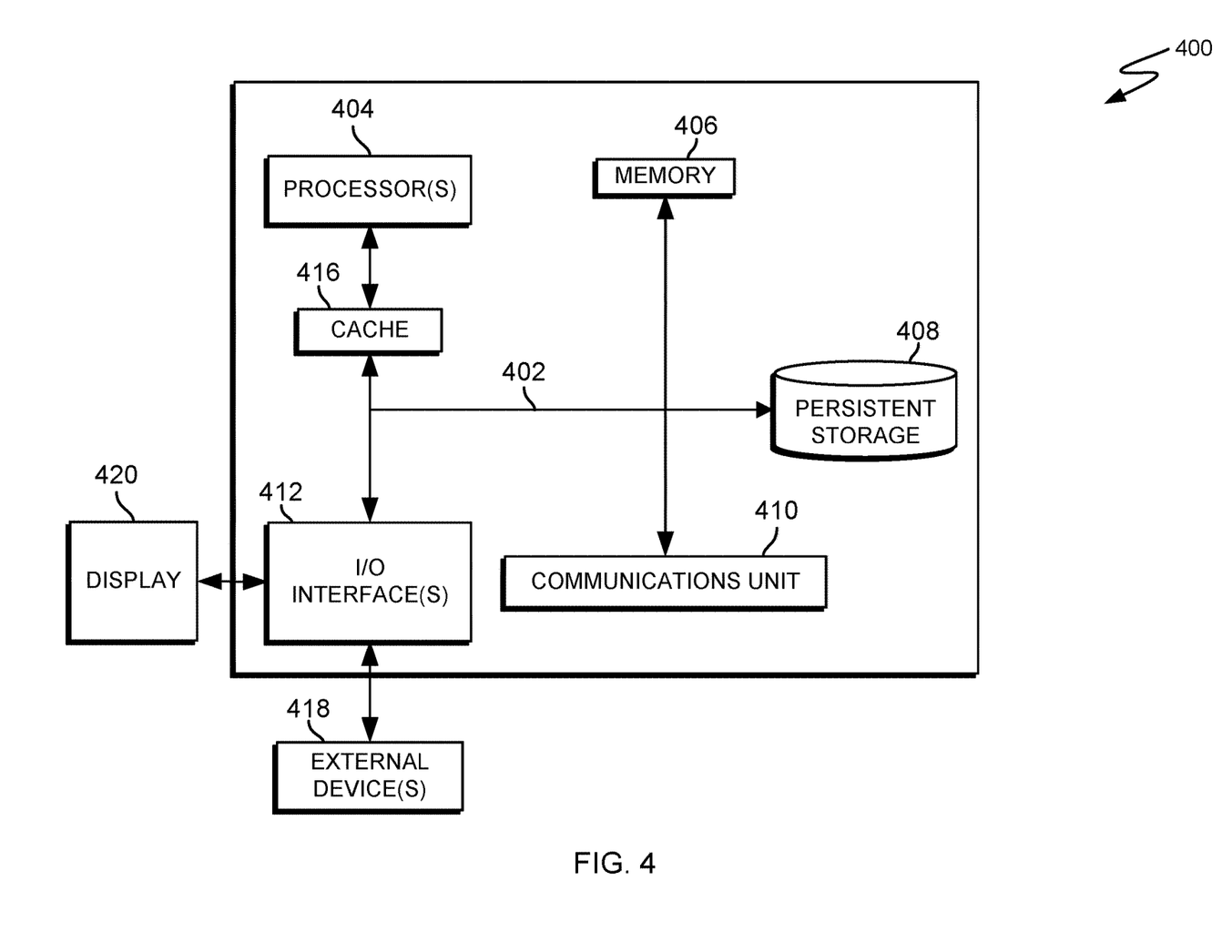
FIG. 4 illustrates a block diagram of components of the server and/or the computing device, in accordance with an embodiment of the present invention.

FIG. 4 illustrates a block diagram of components of COMMUNICATION DEVICE 110, COMPUTER SYSTEM 120 and TAPE LIBRARY 132 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as, microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as, microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as, a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as, punch-cards or raised structures in a groove having instructions recorded thereon, and any suitable combination of the foregoing. A computer readable storage medium, as used herein, is not to be construed as being transitory signals per se, such as, radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, for storing video data in a plurality of tape media via a ring buffer, the method comprising:
    receiving, by a tape data splitter, video data stored in a ring buffer;
    writing, by the tape data splitter, the video data to a current tape media;
    detecting, by the tape data splitter, an end of tape media event, wherein the end of tape media event comprises a predetermined buffer time preceding the physical end of the tape media;
    responsive to the end of tape media event, switching, by the tape data splitter, the current tape media to a next tape media;
    selecting, by the tape data splitter, a resume point for the video data stored in the ring buffer, wherein the resume point is identified from a previous cut point and the ring buffer is sized to encompass a time interval of at least a video duration of a longest cut duration; and
    writing, by the tape data splitter, to the next tape media, the video data stored in the ring buffer that is subsequent to the resume point.

2. The method of claim 1 wherein the resume point, further comprises at least one of a previous cut point preceding the end of tape media event or a predetermined margin time point added to at least one of the previous cut point and the minimum secured time point.

3. The method of claim 1, wherein writing the video data stored in the ring buffer further comprises clearing the video data stored in the ring buffer preceding the resume point.

4. The method of claim 1, wherein the ring buffer storage has a size that encompasses the video data for a selected time interval wherein the selected time interval corresponds to a predetermined margin time interval and at least one of a longest cut duration of the video data and a predetermined minimum secured time interval.

5. The method of claim 1, wherein the end of tape media event further comprises an identification of a physical end of the tape media.

6. The method of claim 1 wherein switching comprises
    pausing, by the tape data splitter, writing the video data to the current tape media; and
    selecting, by the tape data splitter, the next tape media for writing the video data from the resume point.

7. The method of claim 1, wherein the next tape media is processed as the current tape media and a tape media replacement is processed as the next tape media, creating repeated tape switching.

8. A computer program product, for storing video data in a plurality of tape media via a ring buffer, the computer program product comprising:
    one or more non-transitory computer readable storage media and program instructions stored on the one or more non-transitory computer readable storage media, the program instructions comprising:
    program instructions to, receive, by a tape data splitter, video data stored in a ring buffer;
    program instructions to, write, by the tape data splitter, the video data to a current tape media;
    program instructions to, detect, by the tape data splitter, an end of tape media event, wherein the end of tape media event comprises a predetermined buffer time preceding the physical end of the tape media;
    program instructions to, respond to the end of tape media event, switching, by the tape data splitter, the current tape media to a next tape media;
    program instructions to, select, by the tape data splitter, a resume point for the video data stored in the ring buffer, wherein the resume point is identified from a previous cut point and the ring buffer is sized to encompass a time interval of at least a video duration of a longest cut duration; and
    program instructions to, write, by the tape data splitter, to the next tape media, the video data stored in the ring buffer that is subsequent to the resume point.

9. The computer program product of claim 8 wherein the resume point, comprises at least one of a previous cut point preceding the end of tape media event or a predetermined margin time point added to at least one of the previous cut point and the minimum secured time point.

10. The computer program product of claim 8, wherein write the video data stored in the ring buffer further comprises clearing the video data stored in the ring buffer preceding the resume point.

11. The computer program product of claim 8, wherein the ring buffer storage has a size that encompasses the video data for a selected time interval wherein the selected time interval corresponds to a predetermined margin time interval and at least one of a longest cut duration of the video data and a predetermined minimum secured time interval.

12. The computer program product of claim 8, wherein the end of tape media event further comprises an identification of a physical end of the tape media.

13. The computer program product of claim 8 wherein switching comprises
- program instructions to, pausing, by the tape data splitter, writing the video data to the current tape media; and
- program instructions to, selecting, by the tape data splitter, the next tape media for writing the video data from the resume point.

14. The computer program product of claim 8, wherein the next tape media is processed as the current tape media and a tape media replacement is processed as the next tape media, creating repeated tape switching.

15. A computer system, for storing video data in a plurality of tape media via a ring buffer, the computer system comprising:
- one or more computer processors;
- one or more non-transitory computer readable storage media;
- program instructions stored on the one or more computer non-transitory readable storage media for execution by at least one of the one or more computer processors, the program instructions comprising:
  - program instructions to, receive, by a tape data splitter, video data stored in a ring buffer;
  - program instructions to, write, by the tape data splitter, the video data to a current tape media;
  - program instructions to, detect, by the tape data splitter, an end of tape media event, wherein the end of tape media event comprises a predetermined buffer time preceding the physical end of the tape media;
  - program instructions to, respond to the end of tape media event, switching, by the tape data splitter, the current tape media to a next tape media;
  - program instructions to, select, by the tape data splitter, a resume point for the video data stored in the ring buffer, wherein the resume point is identified from a previous cut point and the ring buffer is sized to encompass a time interval of at least a video duration of a longest cut duration; and
  - program instructions to, write, by the tape data splitter, to the next tape media, the video data stored in the ring buffer that is subsequent to the resume point.

16. The computer system of claim 15 wherein the resume point, comprises at least one of a previous cut point preceding the end of tape media event or a predetermined margin time point added to at least one of the previous cut point and the minimum secured time point.

17. The computer system of claim 15, wherein write the video data stored in the ring buffer further comprises clearing the video data stored in the ring buffer preceding the resume point.

18. The computer system of claim 15, wherein the ring buffer storage has a size that encompasses the video data for a selected time interval wherein the selected time interval corresponds to a predetermined margin time interval and at least one of a longest cut duration of the video data and a predetermined minimum secured time interval.

19. The computer system of claim 15, wherein the end of tape media event further comprises an identification of a physical end of the tape media.

20. The computer system of claim 15 wherein switching comprises
- program instructions to, pausing, by the tape data splitter, writing the video data to the current tape media; and
- program instructions to, selecting, by the tape data splitter, the next tape media for writing the video data from the resume point.

* * * * *